US010680675B1

(12) United States Patent
Callahan et al.

(10) Patent No.: US 10,680,675 B1
(45) Date of Patent: Jun. 9, 2020

(54) LOGICAL TO PHYSICAL MAPPING OF AIRCRAFT ELECTRONIC COMPONENTS

(71) Applicant: The Boeing Company, Chicago, IL (US)

(72) Inventors: Kevin S. Callahan, Chicago, IL (US); Dennis Whetten, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/292,536

(22) Filed: Mar. 5, 2019

(51) Int. Cl.
*H04B 3/54* (2006.01)
*B64D 11/00* (2006.01)
*H04L 29/12* (2006.01)
*B64D 11/06* (2006.01)
*B64D 45/00* (2006.01)

(52) U.S. Cl.
CPC ....... *H04B 3/544* (2013.01); *B64D 11/00155* (2014.12); *B64D 11/0624* (2014.12); *H04B 3/542* (2013.01); *H04L 61/6022* (2013.01); *B64D 45/00* (2013.01); *H04B 3/546* (2013.01)

(58) Field of Classification Search
CPC ........ H04B 3/544; H04B 3/542; H04B 3/546; B64D 11/00155; B64D 11/0624; B64D 45/00; H04L 61/6022
USPC ........................................... 340/12.32, 12.31
See application file for complete search history.

(56) References Cited

U.S. PATENT DOCUMENTS

| 8,896,456 | B2 * | 11/2014 | Curtis | G08B 5/00 340/667 |
| 9,033,215 | B1 * | 5/2015 | Ashford | G06F 3/03545 235/375 |
| 9,282,530 | B1 * | 3/2016 | Couleaud | H04W 72/0406 |
| 10,370,116 | B2 * | 8/2019 | Lauer | H04L 67/12 |
| 2003/0093798 | A1 * | 5/2003 | Rogerson | H04L 12/28 725/75 |
| 2011/0162015 | A1 * | 6/2011 | Holyoake | H04N 7/18 725/76 |
| 2015/0126177 | A1 * | 5/2015 | Bauer | H04L 67/125 455/420 |

(Continued)

OTHER PUBLICATIONS

Akl, Gayraud, Berthou, A New Wireless Architecture for In-Flight Entertainment Systems Inside Aircraft Cabin, HAL Archives-ouvertes, Jan. 18, 2012.

(Continued)

*Primary Examiner* — Nam V Nguyen
(74) *Attorney, Agent, or Firm* — McDonnell Boehnen Hulbert & Berghoff LLP (57) ABSTRACT

Examples for logical to physical mapping of aircraft electronic components are presented. A system may include aircraft electronic components coupled sequentially to a power wire, corresponding controllers, and a master computing device. The computing device may receive a first identifier for a first component from a first controller in response to the first controller receiving power at a first time from the power wire and a second identifier for a second component from a second controller in response to the second controller receiving power at a second time from the power wire. The second time is subsequent to the first time. The computing device determines locations for the first and second component within the aircraft based on an order of reception of the identifiers.

20 Claims, 8 Drawing Sheets

(56) References Cited

U.S. PATENT DOCUMENTS

| | | | |
|---|---|---|---|
| 2015/0242765 A1* | 8/2015 | Muirhead | B64D 11/0015 |
| | | | 705/5 |
| 2018/0075717 A1* | 3/2018 | Reinbold | B64D 11/06 |
| 2019/0141447 A1* | 5/2019 | Dunn | B64D 11/0015 |
| 2019/0197748 A1* | 6/2019 | Vandewall | G06F 9/453 |

OTHER PUBLICATIONS

Dipl.-ing, Leipold, Wireless UWB Aircraft Cabin Communication System, Technische Universitat Munchen, Chapter 2, Jun. 20, 2011.

* cited by examiner

RESPONSIVE TO RECEIVING THE FIRST IDENTIFIER FOR THE FIRST COMPONENT, CAUSE A FIRST POWER SWITCH TO ENABLE POWER TRANSMISSION BEYOND THE FIRST COMPONENT VIA THE AT LEAST ONE POWER WIRE
— 510

FIGURE 7

RESPONSIVE TO RECEIVING THE SECOND IDENTIFIER FOR THE SECOND COMPONENT, CAUSE A SECOND POWER SWITCH TO ENABLE POWER TRANSMISSION BEYOND THE SECOND COMPONENT VIA THE AT LEAST ONE POWER WIRE
— 512

RECEIVE, FROM A THIRD CONTROLLER, A THIRD IDENTIFIER FOR A THIRD COMPONENT OF THE PLURALITY OF COMPONENTS, WHEREIN THE THIRD CONTROLLER TRANSMITS THE THIRD IDENTIFIER IN RESPONSE TO RECEIVING POWER AT A THIRD TIME FROM THE AT LEAST ONE POWER WIRE, AND WHEREIN THE THIRD TIME IS SUBSEQUENT TO THE FIRST TIME AND THE SECOND TIME
— 514

LOGICAL TO PHYSICAL MAPPING OF AIRCRAFT ELECTRONIC COMPONENTS

FIELD

The present disclosure relates generally to a logical to physical mapping system for components, and more particularly to a logical to physical mapping of aircraft electronic components installed within an aircraft.

BACKGROUND

A passenger aircraft typically includes seats to accommodate each passenger for the duration of a flight. Such seats are often arranged in a number of rows organized in columns to accommodate passengers in a manner that efficiently uses the fuselage of the aircraft. For instance, two groups of three seats may make up a row with an aisle extending between the groups. Each seat group may include seat electronics that provide features to the passengers to use during flight, such as power ports, headphone ports, call buttons, lights, and in-flight entertainment system electronics.

SUMMARY

In one example, a system for determining a location of electrical components within an aircraft is described. The system includes a plurality of components installed within the aircraft. The plurality of components is coupled sequentially to at least one power wire. The system also includes a plurality of controllers. Each controller is configured to couple to a given component of the plurality of components. The system further includes a master computing device for storing respective locations of the plurality of components within the aircraft. Particularly, the master computing device is configured to receive, from a first controller, a first identifier for a first component of the plurality of components. The first controller transmits the first identifier in response to receiving power at a first time from the at least one power wire. The master computing device is also configured to receive, from a second controller, a second identifier for a second component of the plurality of components. The second controller transmits the second identifier in response to receiving power at a second time from the at least one power wire. The second time is subsequent to the first time. The master computing device is also configured to determine a first location for the first component and a second location for the second component within the aircraft based on an order of reception of the first identifier and the second identifier. As such, the master computing device is further configured to generate an output that specifies the first location for the first component and the second location of the second component within the aircraft.

In another example, a method for localizing electronic components within an aircraft is described. The method includes receiving, at a computing system and from a first controller, a first identifier for a first component of a plurality of components. The plurality of components is coupled sequentially to at least one power wire within the aircraft. The first controller transmits the first identifier in response to receiving power at a first time from the at least one power wire. The method includes receiving, at the computing system and from a second controller, a second identifier for a second component of the plurality of components. The second controller transmits the second identifier in response to receiving power at a second time from the at least one power wire where the second time is subsequent to the first time. The method includes determining, by the computing system, a first location for the first component and a second location for the second component within the aircraft based on an order of reception of the first identifier and the second identifier. The method includes generating an output that specifies the first location for the first component and the second location of the second component within the aircraft.

In an additional example, a non-transitory computer-readable medium is described. The non-transitory computer-readable medium is configured to store instructions, that when executed by one or more processors, cause a computing system to perform functions. The functions include receiving, from a first controller, a first identifier for a first component of a plurality of components. The plurality of components is installed within an aircraft and coupled sequentially to at least one power wire. The first controller transmits the first identifier in response to receiving power at a first time from the at least one power wire. The functions also include receiving, from a second controller, a second identifier for a second component of the plurality of components. The second controller transmits the second identifier in response to receiving power at a second time from the at least one power wire, and the second time is subsequent to the first time. The functions also include determining a first location for the first component and a second location for the second component within the aircraft based on an order of reception of the first identifier and the second identifier. The functions also include generating an output that specifies the first location for the first component and the second location of the second component within the aircraft.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Aircrafts often include numerous electronic components that are installed within the fuselage or other areas. The seats of a passenger aircraft often include seat electronics for each row of seats to provide features to the passengers, such as light, call buttons, power, and in-flight entertainment system electronics. Other types of electric and non-electronic components can also be installed within the aircraft.

Seat electronics and other components are often multiples of the same components. For instance, each group of seats may include the same component set up resulting in a repetitive component configuration overall. As a result, such an arrangement can make it difficult to logically identify a particular component after installation. For instance, the repetitive configuration for seat electronics might make it difficult to differentiate between a light component within the seat electronics of row 4 and the light component within the seat electronics of row 6. As such, it might be desirable for systems of an aircrafts to have access to a network of information that associates identifiers for components according to the physical locations of the components within the aircraft. In addition, the network may help decrease component repair time since technicians could access the data to identify the physical location of a component that may be operating erroneously.

Example implementations presented herein involve systems, methods, and non-transitory computer readable medium for determining the locations of electrical components. Electric components within an aircraft frequently share a common power source. Particularly, each component may connect directly or indirectly (e.g., through another component) to a common power link (e.g., a set of one or more power wires). For instance, seat electronics may couple to the same set of power wires in a sequential order that corresponds to the arrangement of the rows of seats (e.g., rows 1, 2, 3 . . . have seat electronics that connect in that order to the power source).

The sequential connection order to the common power source allows example systems presented herein to map the physical locations of the electric components. In particular, a system may utilize a process that provides power to each component (or group of electric components) in a component by component basis that allows the system to obtain an identifier for each component (or group of electric components) that is subsequently used to physically map the locations of the components within the aircraft.

The system is able to execute the process by using power switches (or other types of power management components) to deliver power on the component by component basis according to the sequential order that the components are connected. For instance, a first power switch may be used to prevent power from being delivered to any components beyond a first device (i.e., one or more electric components) in the sequential connection order. After the first device receives power and an identifier is obtained for the first device by a computing device in the network (e.g., a master computing device), the first power switch may be triggered to allow power to be delivered to a next device. Power delivery to the second device may cause the second device to provide an identifier to the master computing device enabling the master computing device to physically associate that identifier for the electronic component at that location. Here again, a second power switch may be used to prevent power from reaching other devices (e.g., groups of one or more electric components) until the master computing device is able to associate an identifier for the second device with the physical location of the device within the aircraft. As such, the second device may be triggered after the master computing device receives the second identifier to allow power to reach the next device in the sequential order of devices.

The system may repeat this process until detecting the end of the components in the sequential order. At this point, the system may have determined or may determine a mapping that links identifiers for components with the physical locations of the components within the aircraft. In some examples, the system may perform the process for each column of seat rows to physically map the locations of component identifiers (i.e., each column is performed using a cycle of the process). In other examples, the system may map seat electronics and other components within the aircraft using a single process.

Further, the sequential order that the components receive power may depend on the location of the power source and the route of power from the power source. For instance, the power source may originate in the back of the fuselage resulting in seat electronics positioned in the back rows (e.g., row 40) to receive power first. As such, the system may be configured to identify the first set of seat electronics with row 40 (i.e., component identifiers for components within the first set of seat electronics are physically mapped to row 40). As discussed above, in such situation, the system may subsequently map component identifiers for components associated with the next set of seat electronics to row 39 and repeat this process until identifiers for components within all sets of seat electronics are obtained to allow physically mapping the entire column of seats (or multiple columns of seats to be mapped (e.g., identifiers with a left or right indication). In further examples, the system may be configured to map components to particular seats within each seat row.

During the mapping process, communication between installed electronic components can occur in various ways. In some examples, communication of components identifiers to a master computing device may involve using one or more wired datalinks. For instance, when a component initially receives power during the mapping process, the component may provide an identifier to the master computing device using a wired datalink. In other examples, the communication of component identifiers to the master computing device may occur wirelessly. For example, the master computing device may obtain media access control (MAC) addresses for components.

Components may be configured to provide identifiers directly to the system for mapping and recordation upon being powered on. For instance, an in-flight entertainment system may provide identifying information to the master computing system upon being powered on. In some examples, controllers may be configured to communicate identifying information for associated components to the master computing device. For instance, a first controller may communicate an identifier for a first component upon reception of power at the first controller and/or the first component. As indicated above, the first component may be associated with a first power switch that enables the system to provide power only to the first component and first controller until receiving an identifier to associate with the first component. In some examples, the first controller and first switch are associated with a first group of components. As such, the first controller may convey identifiers for multiple components in the same row of seats to the master computing device (e.g., identifiers for three light units since each seat has a light unit).

The set up associating a controller and a power switch with one or more associated components may be repeated at each seat group (e.g., row of seats) enabling the master computing device to map component identifiers to the physical locations of the components within the aircraft. In some examples, the master computing device may use aircraft configuration information when mapping component identifiers to physical locations within the aircraft. For instance, the master computing device may use a predefined layout for seats and knowledge of the power source and direction of power supply to when associating component identifiers with physical locations (e.g., associating devices with each row of seats).

The system may make the mapping information available to systems of the aircraft. For instance, the call system that enables passengers to request service via buttons may use component identifiers to associate the physical locations of buttons to particular rows (or by seats within the rows) on a seating map. As a result, an attendant may quickly locate the position of a passenger requesting service by checking the seating map. The system may be configured to generate other outputs using the component identifiers that physically map the locations of components. For instance, a monitoring system may use the component identifiers and further sensor data to detect components experiencing an error.

In some examples, an aircraft or another type of vehicle may include multiple columns of seat rows separated by one or more aisles. As such, the master computing device may be configured with a mechanism that enables the master computing device to uniquely identify each column of electronic components. To configure the mechanism, the system mapping the electrical components may provide a unique electrical signal to a "first controller" in each column by way of a strapping pin. A strapping pin may correspond to one or more electrical contacts in an electronic device's input connector that are connected to a ground reference. The pins connected to the ground reference may constitute a positive (e.g., "1") and those not connected may constitute a negative (e.g., "0"), forming a binary number that can be compared to pre-programmed internal software to determine the location of the electronic device. The strapping pin configuration, at the head of each column of seats, may be common across the different columns within various aircraft configurations. As such, the strapping pin configuration may enable the system to use the unique electrical signal process to differentiate between columns of seats.

In another example, the system may use discrete data buses (e.g., Ethernet) that can be hard-wired to the head (e.g., front) of each column of electrical components, such as the front of each column of seats within an aircraft. The discrete data buses can be routed to a unique physical port on the master computing device enabling the master computing device to uniquely identify and differentiate between each column of rows.

Figure 1:
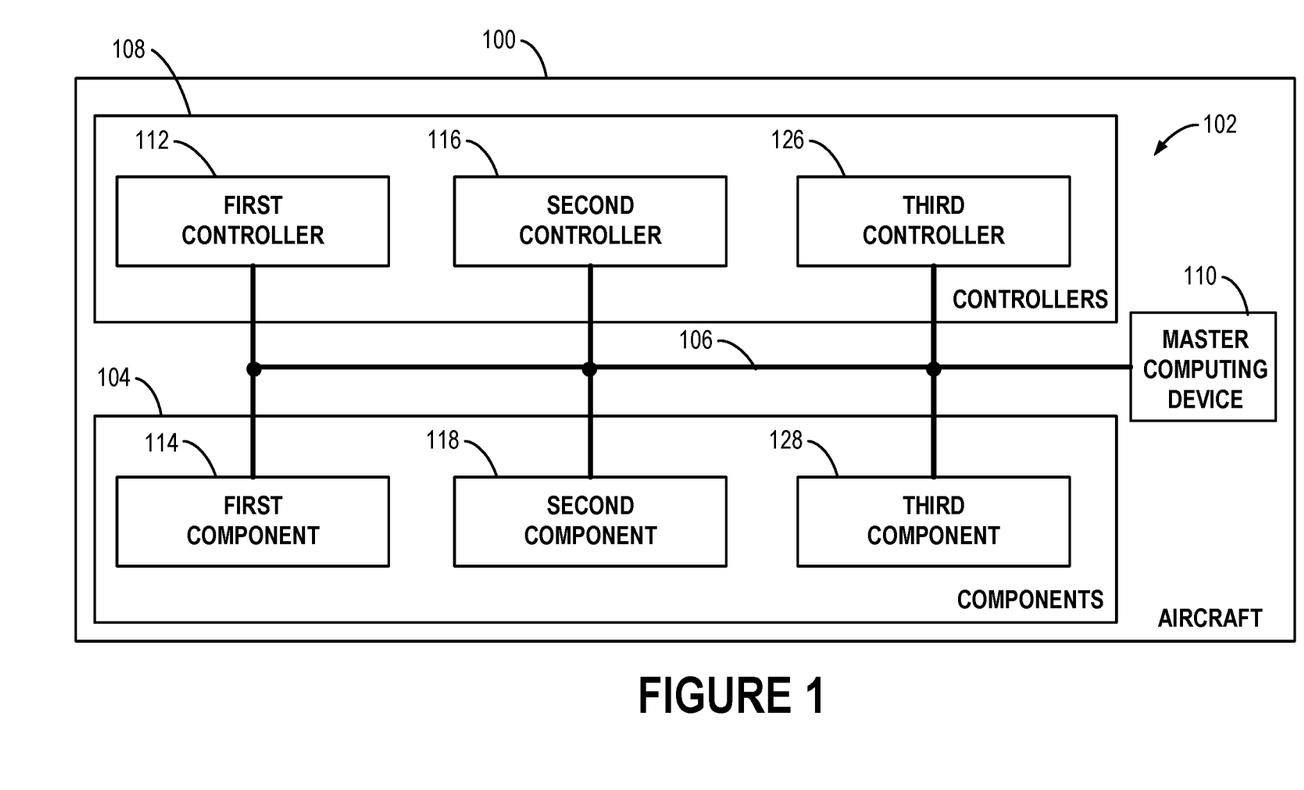
FIG. 1 is a block diagram for components of a system configured to determine physical locations for device identifiers, according to an example implementation.

Referring now to the Figures, FIG. 1 is a block diagram of an aircraft 100 including components of a system 102 configured to determine physical locations for device identifiers. The system 102 is configured to determine locations of electrical components, such as the location of seat electronics within an aircraft 100. As such, the system 102 includes components 104, a power wire 106, controllers 108, and a master computing device 110. In other examples, the system 102 may include more or fewer components in different arrangements. For instance, the controllers 108 may be part of the components 104 in another example implementation. Additional configurations are described below.

The system 102 represents an example system capable of logically mapping the physical location of components 104 within the aircraft 100. Rather than having an installation mechanic spend time meticulously mapping identifiers for components 104 by location as each component is installed, the system 102 may automatically determine locations for components 104. In particular, the system 102 may enable the master computing device 110 to determine locations for electronic components within the aircraft 100 without assistance from a human operator. In other examples, a system can be used to determine locations of electronic components installed in other types of vehicles, such as ground vehicles (e.g., buses), water vehicles (e.g., a boat), or other aerial vehicles. The system 102 can also be used to determine the locations of electronic components within a physical building, such as location of seat electronics within a movie theater.

The system 102 may logically map the physical locations of the components 104 after initial installation of the components 104. In particular, the system 102 may identify locations of the components 104 by powering the components 104 one a component by component order using the power wire 106. In other examples, the system 102 may logically map the physical locations of the components 104 upon powering on the aircraft. This way, the system 102 can perform a reset and identify the location of the components 104 thereafter by supplying power in the linear fashion.

The aircraft 100 may be any type of aerial vehicle that utilizes components 104. In some examples, the aircraft 100 may be configured to transport passengers and may include seats for each passenger. Each seat (or grouping of seats) may have an associated set of seat electronics. As such, seat electronics and other electrical components are represented by components 104 as shown in FIG. 1.

Components 104, also described herein as devices, may include various types of electronics, such as seat electronics. Example seat electronics include power ports, audio or audiovisual entertainment; call buttons, and light switches. Seat electronics may correspond to electronic components for groups of seats. In some embodiments, the components 104 may include non-electric components that are associated with one or more electrical components capable of obtaining power and communicating a signal in response.

Each component 104 or group of components may include one or more identifiers. For instance, a component 104 may be associated with a unique part number, serial number, and/or MAC address. A unique part number is an identifier of a particular component design used in a particular industry. Components 104 may include unique part numbers to simplify references to each component 104. Components of the same type, however, may share the same unique part number. For instance, each call button may have the same unique part number. A serial number is a unique identifier assigned incrementally or sequentially to an item to uniquely identify the item. Serial numbers can identify otherwise identical individual units (e.g., call buttons with the same unique part numbers). A MAC address of a component 104 is a unique identifier assigned to a network interface controller (NIC) for communications at the data link layer of a network segment. MAC addresses are used as a network address for some IEEE 802 network technologies, such as Ethernet, Wi-Fi, and Bluetooth.

Power wire 106 represents a connection to a power source configured to deliver power to the components 104, the controllers, 108, and the master computing device 110. The configuration of the power wire 106 can vary. For instance, the power wire 106 may be a set of power wires (e.g., three power wires) configured to deliver three phase power to the components 104 that are connected. The position of the power source within the aircraft 100 can vary. For instance, the power source can be located in the back of the aircraft 100 and transmit power from the back to the front along power wire 106. The power source may be configured to deliver direct current (DC) power or alternating current (AC) to the components 104, the controllers 108, and the master computing device 110 using the power wire 106.

In some embodiments, the power wire 106 may also be associated with other types of wires, such as a data link or a grounding wire. The data link may serve as a connection between connected components 104 and the master computing device 110. The grounding wire may act as a ground for the components 104.

In addition, the system 102 may further include power switches not shown in FIG. 1. Each power switch may be associated with a component or group of components to enable the system 102 to supply power to the components on a component by component basis that depends on the sequential order that the components are connected to the power wire 106. For example, a first power switch may be associated with a first row of seat electronics, a second power switch may be associated with a second row of seat electronics, and so on for all the rows. This way, the system can use the power switches to control the supply of power and obtain identifiers for each row of seat electronics in a linear manner.

The controllers 108 may operate within the system 102 and serve to communicate with the master computing device 110. In particular, the controllers 108 may communicate identifying information for components to the master computing device 110 in response to obtaining power. As shown in FIG. 1, the controllers 108 include a first controller 112, a second controller 116, and a third controller 126 such that each controller is associated with a corresponding component. Each controller may communicate information about the associated component with the master computing device 110. For instance, the first controller 112 may receive power directly or indirectly (e.g., through the first component 114) from the power wire 106 and responsively provide a signal that can be used to identify the first component 114. The identifier may depend on the first component 114. In some instances, the identifier may dependent on the first controller 112 such that the master computing device 110 is able to identify a location of the first controller 112 and the associated first component 114.

The quantity of controllers 108 and components 104 shown in FIG. 1 is for illustration purposes, but may include numerous more within examples. In other examples, the components 104 may be configured to perform operations that the controllers 108 can perform during physical mapping of the components 104 by the system 102 thereby removing the need for physically separate controllers 108.

The master computing device 110 represents a data system that is configured to determine the physical locations of the components 104 within the aircraft 100. As such, the master computing device 110 may be any type of device with one or more processors configured to perform operations. In some examples, the master computing device 110 may be one or more computing devices operating within a network.

The master computing device 110 is configured to receive identifier information from the controllers 108 and the components 104. In some examples, the master computing device 110 may communicate with the controllers 108 and the components 104 via a wired data link. In other examples, the master computing device 110 may communicate wireless with the controllers 108 and the components 104. For instance, short range wireless (e.g., Wi-Fi) communication technology may be used.

Communication between the master computing device 110 and one or both of the controllers 108 and the components 104 may enable the master computing device 110 to determine locations for the components 104. The system 102 may supply power to each controller and corresponding components in a step by step manner using power switches the can manage power supply between component groups. As such, the master computing device 110 may receive component identifiers from either the components 104 or the controllers 108 in response to the signal transmitting device being powered on. For instance, when the first controller 112 receives power via the power wire 106, the first controller 112 may responsively transmit a first identifier for the first component 114 (e.g., one or more components) to the master computing device 110. In some examples, the first identifier may be provided by the first component 114 directly to the master computing device 110.

The master computing device 110 may receive a second identifier for the second component 118 from the associated second controller 116 and a third identifier for the third component 128 from the third controller 126 when each controller receives power (e.g., the second identifier at an initial time and a third identifier at a subsequent time). The order that the master computing device 110 receives identifiers from the components 104 or the controllers 108 depends on the sequential order that the components 104 (or corresponding controllers 108) are coupled to the power wire 106 and the position of the power source relative to the power wire 106. As such, the master computing device 110 may map identifiers for the components 104 at the physical locations within the aircraft 100. The master computing device 110 may maintain this data and enable systems of the aircraft 100 to access it. In addition, the master computing device 110 may generates outputs that utilize the information, such as an output that maps the locations of call buttons to particular seat rows. Technicians or other personnel may use the component map to identify the location of a particular component within the aircraft 100.

In some examples, one of the controllers 108 (e.g., the first controller 112) may perform the role of the master computing device 110 within the system 102. All controllers 108 may be capable of operating as the master computing device 110. As such, a particular controller of the controllers 108 may be identified to serve as the master computing device 110 by using strapping pins in the particular controller's input connector. For example, a controller located in the middle of the cabin of the aircraft 100 may be configured to check pins connected to the ground to determine whether or not to operate as the master computing device 110. Controllers that do not identify the pin connected to the ground may operate as standard controllers rather than the master computing device 110. As such, upon boot up or system configuration (e.g., power on), a controller that identified the strapping pin in the input connector may perform as the master computing device 110.

Figure 2:
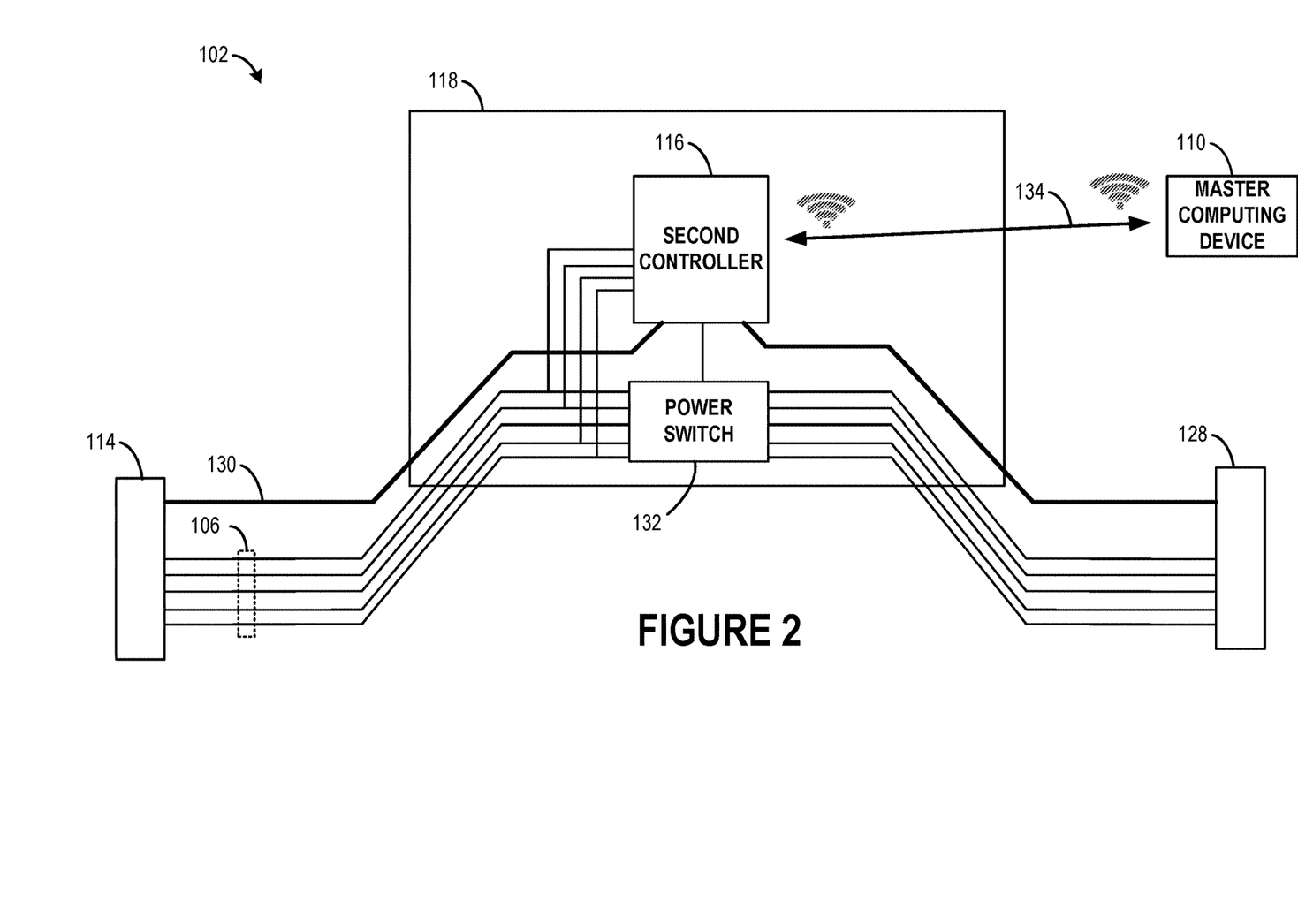
FIG. 2 illustrates the system for logical to physical mapping of components of an aircraft, according to an example implementation.
Figure 3:
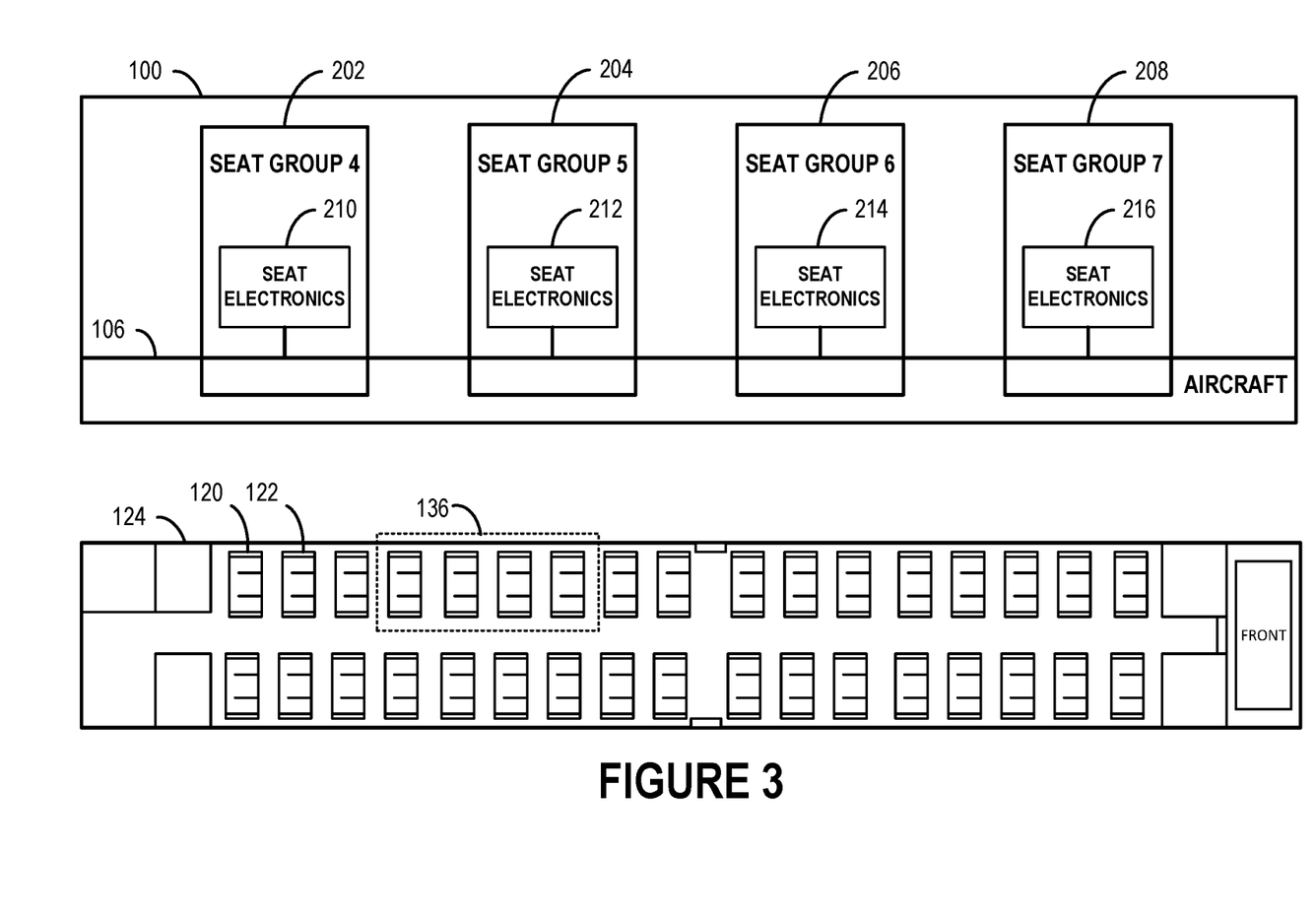
FIG. 3 is another illustration of the system, according to an example implementation.

FIG. 2 illustrates another view of the system 102 for logical to physical mapping of components 104 of an aircraft 100. The system 102 is shown to further illustrate the set up of the second controller 116, the second component 118, and an associated power switch 132. In particular, the second component 118 represents a set seat electronic components associated with a row of seats (e.g., row 17 as shown in FIG. 3). The second component 118 is shown associated with the second controller 116 and the power switch 132. This set up involving a set of seat electronics, controller, and power switch may be repeated for the first component 114, the third component 128, and every other seat row in aircraft 100.

The power wire 106 is represented as a set of wires that link the first component 114, the second component 118, and the third component 128 as well as components for other rows of the aircraft 100. As shown in FIG. 2, the power wire 106 may supply power to the set of seat electronics and the second controller 116 to enable the second controller 116 to communicate a signal to the master computing device 110. During power supply, the power switch 132 may prevent power to be supplied beyond the second component 118 enabling the master computing device 110 to detect the second controller 116 (e.g., receive an identifier from the second controller 116). After the master computing device 110 receives a signal from the second controller, the power switch 132 may be triggered to allow power to be supplied to the third component 128 to repeat the identification process.

The example configuration shown in FIG. 2 illustrates different options that can be used to enable communication between the second controller and the master computing device. In some examples, communication may occur via the wired data link 130. The data link 130 may enable each controller to transmit data (e.g., identifying information for the corresponding components) to the master computing device 110. The second controller 116 and other controllers may communicate with the master computing device 110 via wireless communication as represented by wireless link 134.

FIG. 3 is another illustration of the system 102. In particular, FIG. 3 shows a block diagram of connections between seat group 4 202, seat group 5 204, seat group 6 206, and seat group 7 208. Each seat group may represent a row of seats (e.g., 2 or 3 seats) that includes seat electronics powered by power wire 106. FIG. 3 further shows display 124, which may correspond to a physical mapping of the seat electronics to seats within the aircraft 100.

The system 102 may use the power wire 106 and power switches to supply power to each set of seat electronics per seat group basis. In particular, the system 102 may cause seat electronics 210 to receive power to enable the master computing device 110 to associate components of seat electronics 210 with seat group 4 (i.e., row 14 shown in the display 124). The system 102 then subsequently supply power to the seat electronics 212 associated with seat group 5 204 and then the seat electronics 214 associated with seat group 6 206 in order to map the components to these physical locations within the aircraft 100.

The display 124 may illustrate a layout of the rows within the fuselage of the aircraft 100. As shown in FIG. 3, the output shows that the first component 114 (e.g., a first set of set electronics) is associated with location 120 (i.e., seat row 17) of the aircraft 100 and the second component 118 (e.g., a second set of seat electronics) is associated with location 122 (i.e., a row of seats at location 122). The display 124 also includes box 136 to illustrate the locations of the seat groups 202-206 within the aircraft 100. The master computing device 110 may use a seat layout that depends on the type of aircraft 100 similar to the display 124 to determine and physically map the locations of seat electronics and other components to locations (e.g., seat rows) within the aircraft 100. In particular, master computing device 110 may be configured to identify that an identifier received regarding the seat electronics 210 is located within the first row within the box 136 based on the position of the power source as well as previously receiving identifiers for seat electronics in the first three rows from the back of aircraft 100 (i.e., seat rows 15-17) prior to receiving an identifier that is associated with seat electronics 210. This way, the master computing device can map seat electronics 210 to seat group 4 202 (i.e., seat row 14).

The display 124 can have different appearances within examples. In some examples, the display 124 may include data organized in spreadsheets or another configuration. As such, systems of the aircraft 100 may use the information that indicates the physical locations of components according to seat rows.

Figure 4:
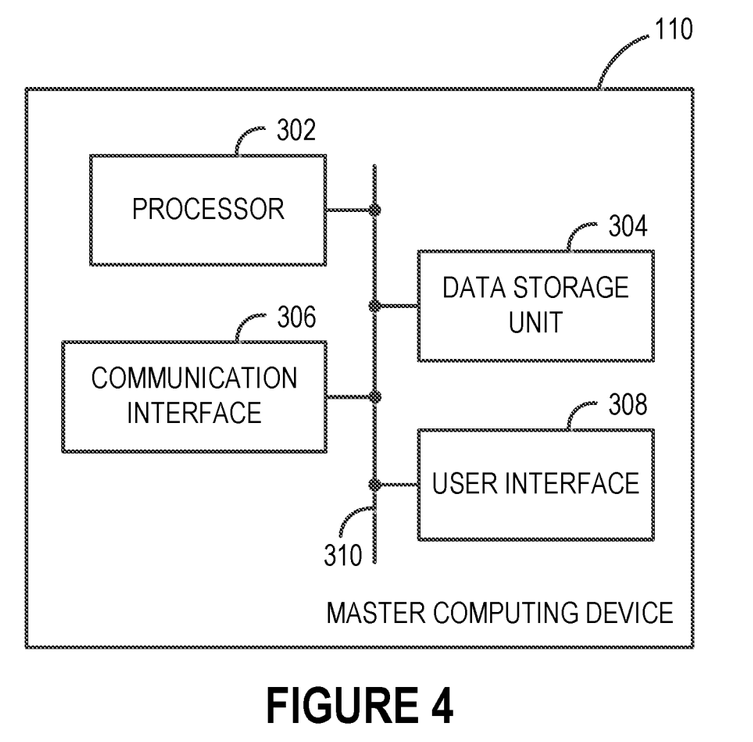
FIG. 4 is a block diagram of a computing device, according to an example implementation.

FIG. 4 is a block diagram of the master computing device 110. The master computing device 110 may perform various acts and/or functions, such as those described in this disclosure. The master computing device 110 may include components, such as a processor 302, a data storage unit 304, a communication interface 306, and a user interface 308. The components can be connected to each other (or to another device, system, or other entity) via a connection mechanism 310, and can include more or less components in other example implementations. In addition, the master computing device 110 may involve multiple computing devices operating within a network.

In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

The processor 302 may represent one or more general-purpose processors (e.g., a microprocessor) and/or one or more special-purpose processors (e.g., a digital signal processor (DSP)). As such, the processor 302 may include a combination of processors within examples. The processor 302 may perform operations, including processing data received from the controllers 108 or components 104.

The data storage unit 304 may include one or more volatile, non-volatile, removable, and/or non-removable storage components, such as magnetic, optical, or flash storage, and/or can be integrated in whole or in part with the processor 302. As such, the data storage unit 304 may take the form of a non-transitory computer-readable storage medium, having stored thereon program instructions (e.g., compiled or non-compiled program logic and/or machine code) that, when executed by the processor 302, cause the master computing device 110 to perform one or more acts and/or functions, such as those described in this disclosure. The master computing device 110 can be configured to perform one or more acts and/or functions, such as those described in this disclosure. Such program instructions can define and/or be part of a discrete software application. In some instances, the master computing device 110 can execute program instructions in response to receiving an input, such as from the communication interface 306 or the user interface 308. The data storage unit 304 may also store other types of data, such as those types described in this disclosure.

The communication interface 306 can allow the master computing device 110 to connect to and/or communicate with another other entity according to one or more protocols. In an example, the communication interface 306 can be a wired interface, such as an Ethernet interface or a high-definition serial-digital-interface (HD-SDI). In another example, communication interface 306 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission.

In some examples, the communication interface 306 may enable communication between the master computing device 110 and the components 104 and/or the controllers 108. For instance, the communication interface 306 may enable wireless communication or wired communication with the controllers 108 to enable the master computing device 110 to physically map logical identifiers for components by locations within the aircraft 100.

The user interface 308 can facilitate interaction between the master computing device 110 and an administrator, if applicable. As such, the user interface 308 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing system 102 and the user of the computing device system. In some examples, the user interface 308 may provide a display 124 to technicians or other personnel to determine locations of components.

Figure 5:
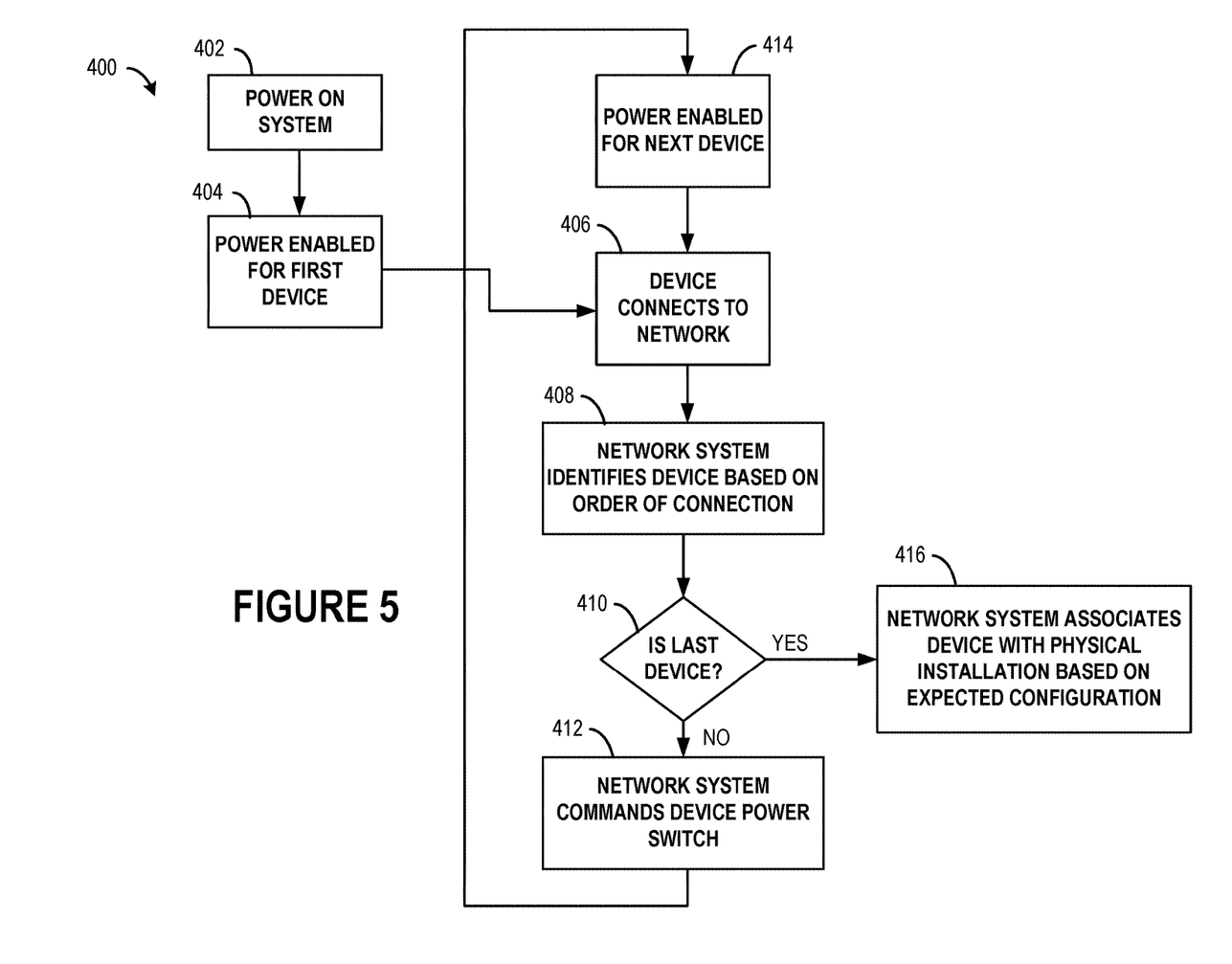
FIG. 5 shows a flowchart of a method, according to an example implementation.

FIG. 5 shows a flowchart of a method, according to an example implementation. The method 400 presents an example method that could be used with the system 102 shown in FIGS. 1-3 or performed by the master computing device 110 shown in FIG. 4. In other examples, components of the devices and/or systems may be arranged to be adapted to, capable of, or suited for performing the functions, when operated in a specific manner.

The method 400 can include one or more operations, functions, or actions as illustrated by one or more of blocks 402, 404, 406, 408, 410, 412, 414, and 416. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 402, the method 400 involves powering on the system. Powering on the system may involve initiating power at a power source. With the system 102 shown in FIGS. 1-3, the components 104 and/or the controllers 108 may be coupled to a common power source in a sequential order via a power wire 106. As such, powering on the system 102 may involve causing the power source associated with the power wire 106 to power on. In some examples, the power source is a power source dedicated to the system 102 and powering the various connected devices. In other examples, the power source may be part of an overall power system associated with powering other components of the aircraft 100 (i.e., the aircraft's main power system). As such, the system 102 may be configured to use power to power the connected devices without impacting the supply of power to other systems of the aircraft 100.

At block 404, the method 400 involves enabling power for a first device. In particular, the first device may correspond to one or more electronic components coupled to the power wire 106 in a first position relative to other components connected to the power wire 106. For example, the first device may be a first controller associated with one or more seats (e.g., a row of seats) or other components. Similarly, the first device may also be one or more seat electronics (e.g., a first set of seat electronics). The first device can be other components within examples.

In some examples, the first device may be coupled to a power wire linked to the power source at a position such that turning on the power source causes the first device to automatically receive power. In other examples, a power switch associated with the first device may require a configuration change to enable the first device to receive power. In addition, the power switch associated with the first device may be configured to temporarily block power to subsequent devices until the system is able to obtain information that identifies the first device.

At block 406, the method 400 involves the first device connecting to a network. By powering the first device, the first device is able to connect to the network formed by the system 102 to determine locations of devices within the aircraft. The first device may be associated with a controller configured to communicate data about the first device to a computing device in the network (e.g., a master computing device). The controller or first device may communicate identifying information (e.g., particular part number) via a wired connection or wireless communication.

At block 408, the method 400 involves the network system identifying the device based on an order of connection. In particular, a master computing device of the system may determine a location of the newly powered on device (e.g., the first device) relative to other devices that previously connected to the network. The network system may use data regarding the layout of the aircraft or other type of vehicle (or building) as well as the position of the power wire and power source to determine locations for the devices.

In some examples, the first controller may transmit a signal that the master computing device uses to generate an identifier for components at that location in the connection order to the power source. For example, the master computing device may receive a signal and associate data from that MAC address with a particular row of seats (e.g., seat row 1).

At block 410, the method 400 involves determining whether the recently identified device is the last device. In particular, the network system may determine if the system has completed identifying devices (and corresponding positions) for the devices coupled to the power source. If the network system determines that the recently identified device is the last device, the method 400 involves proceeding to block 416. If the network system determines that the recently device is not the last device, the method 400 involves proceeding to block 412.

In some examples, the system may identify that the device is the last device (e.g., last set of seat electronics) by using a configuration data for that type of aircraft (e.g., a map of rows). The system may determine that the seat electronics for the last row was identified using the map of rows and responsively proceed to block 416. In some examples, the system may compare the quantity of seat electronics detected with the number of seat rows to determine when the last seat electronics was located for the last row of seats.

In some embodiments, the master computing device may determine whether the identified device is the last device by causing a power switch at the device to allow power to extend to the next device. If the master computing device fails to receive a signal within a predefined threshold of time (e.g., 5 milliseconds), the master computing device may proceed to block 416.

At block 412, the method 400 involves the network system commanding the power switch at the first device to change configuration. For instance, the master computing device may provide a signal to a power switch at the first device to enable power to be supplied beyond the first device via the power wire. As a result, the next device may be powered on and the process to identify electronics for the next row of seats can be performed.

The position of the power switch may vary. In some examples, the power switch may be coupled to the first device such that a controller at the first device can cause the power switch to enable power to extend beyond the first device to a next device. The power switch may be coupled to the power wire at a position in between the first device and the next device.

At block 414, the method 400 involves enabling power for the next device. In particular, trigger the power switch may enable the next device coupled to the power wire to receive power in a manner similar to the first device. Once the next device receives the power, the next device connects to the network (block 406) enabling the network system to identify this device based on the order of connection (block 408). The method 400 then involves performing block 410 to determine if the recently identified device is the last device to be identified. As indicated above, if the network system determines that the recently identified object at block 408 is the last device (block 410) then the method 400 involves proceeding to block 416.

At block 416, the method 400 involves the network system associates devices with physical installation based on the expected layout of the different devices within the aircraft. For example, when the devices are seat electronics for different rows of seats, the network system may associate the locations of each device with particular rows of seats (e.g., the third device is associated with seat row 30 and the fourth device is associated with seat row 29).

The network system may use a predefined configuration based on the type of aircraft to determine the number of rows and quantity of seat electronics that are within the aircraft. In some examples, a master computing device may be configured to use the position of the power source, the configuration of seating within the aircraft, and the order of reception of component identifiers to associate components according to rows. This way, the master computing device may output component location information, such as serial numbers or MAC addresses for components according to seat rows. The master computing device may be configured to repeat the process for each column in the aircraft or may perform one process that enables the master computing device to differentiate between seat electronics on the different sides of the aisle or aisles.

Figure 6:
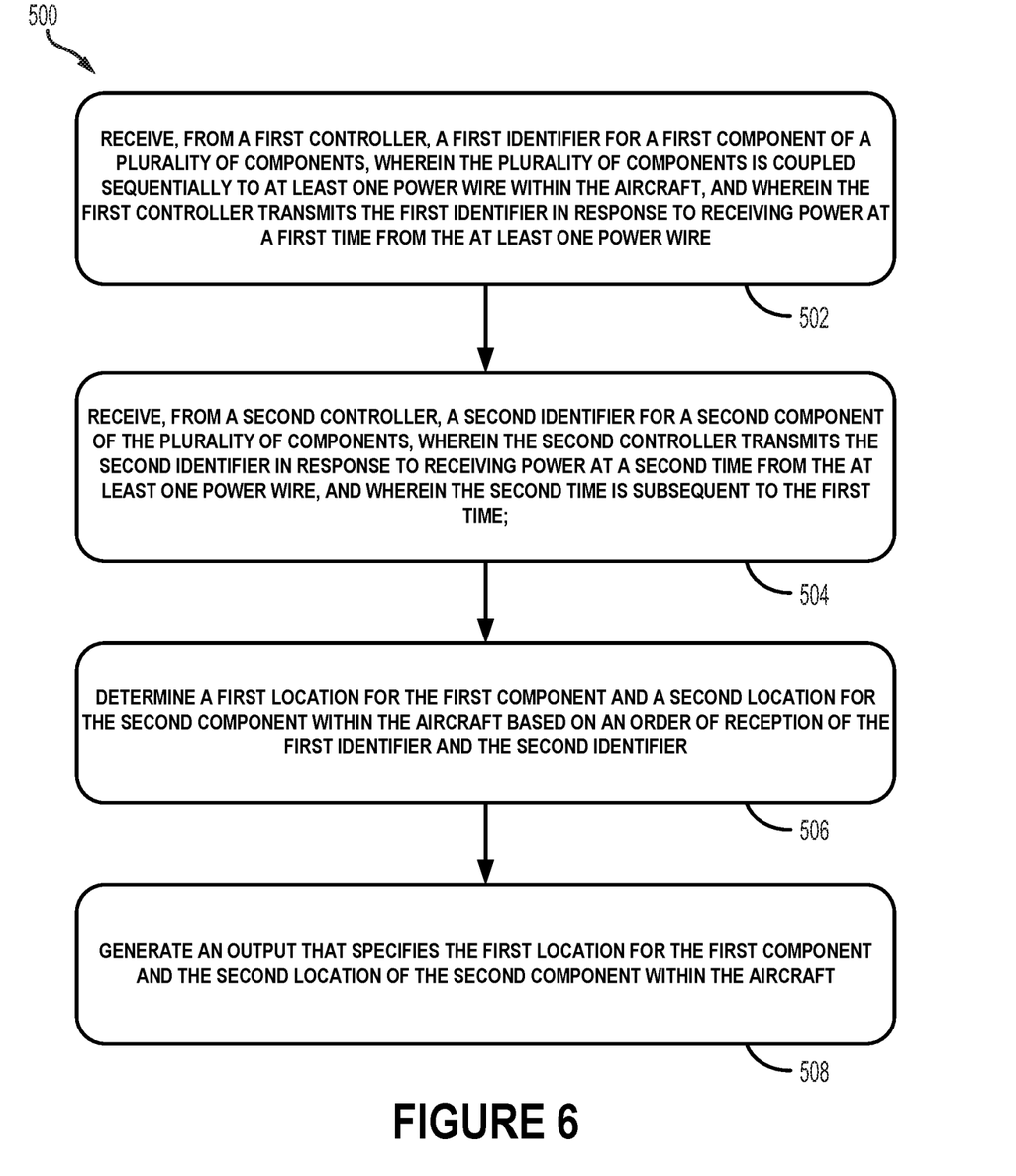
FIG. 6 shows a flowchart of another method, according to an example implementation.

FIG. 6 shows a flowchart of another method, according to an example implementation. Method 500 presents an example method that could be used with the system 102 shown in FIGS. 1-3 or the master computing device 110 shown in FIG. 4. In other examples, components of the devices and/or systems may be arranged to be adapted to, capable of, or suited for performing the functions, when operated in a specific manner.

Method 500 can include one or more operations, functions, or actions as illustrated by one or more of blocks 502, 504, 506, and 508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, the method 500 involves receiving, at a computing system and from a first controller, a first identifier for a first component of a plurality of components. The plurality of components is coupled sequentially to at least one power wire within the aircraft. In addition, the first controller transmits the first identifier in response to receiving power at a first time from the at least one power wire.

In some embodiments, the master computing device 110 or another computing device may receive the first identifier for the first component from the first controller via a wired data link. In other embodiments, the master computing device 110 or another computing device may receive the first identifier for the first component from the first controller via wireless communication. In some examples, a controller may operate as the master computing device 110 and perform the operations described herein.

In addition, the master computing device 110 or another computing device may cause a first power switch to enable power transmission via the at least one power wire beyond the first component. The first power switch may be configured to control power transmission of the power wire beyond the first component. As such, the first power switch may control power transmission along the at least one power wire at some point beyond the first component. The first power switch may be configured to switch and allow power to be transmitted beyond the first component. In some examples, when the first component is the component connected to the power wire at a position closest to the power source, the first controller may provide the first identifier in response to the power source turning on.

At block 504, the method 500 involves receiving, from a second controller, a second identifier for a second component of the plurality of components. The second controller may transmit the second identifier in response to receiving power at a second time from the at least one power wire. The second time is subsequent to the first time.

In some embodiments, the master computing device 110 or another computing device may receive the second identifier for the second component from the second controller via a wired data link. In other embodiments, the master computing device 110 or another computing device may receive the second identifier for the second component from the second controller via wireless communication.

In addition, the master computing device 110 or another computing device may cause a second power switch to enable power transmission via the at least one power wire beyond the second component. The second power switch may be configured to control power transmission of the power wire beyond the second component. As such, the second power switch may control power transmission along the at least one power wire at some point beyond the second component. The second power switch may be configured to switch and allow power to be transmitted beyond the second component.

At block 506, the method 500 involves determining a first location for the first component and a second location for the second component within the aircraft based on an order of reception of the first identifier and the second identifier. In some embodiments, determining the locations for the first and second component (and other components) may be further based on a predetermined seating arrangement associated with a type of aircraft that corresponds to the aircraft. Determining a location of component (or associated controllers) may occur immediately when the master computing device receives an identifier. In other examples, the master computing device may receive and use all identifiers, a predefined seating configuration for the aircraft, and data indicating the position of the power source to determine positions for each component.

At block 508, the method 500 involves generating an output that specifies the first location for the first component and the second location of the second component within the aircraft. The output may include visual graphics for technicians and other personnel to utilize when determining locations of components within the aircraft. In other examples, the output may involve recording and monitoring data that uses the locations of components. For instance, the master computing device may use the determined controller/component locations and sensors to detect and provide locations for components that are operating erroneously.

In some embodiments, generating an output may involve generating a signal that indicates activation of the first component in response to detecting the activation of the first component. Similarly, the master computing device may generate signals that indicate activation of other components as the components receive power.

Figure 7:
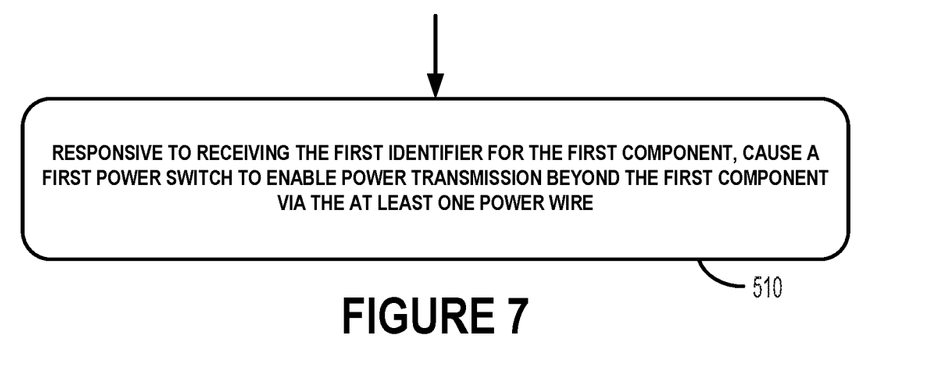
FIG. 7 shows a flowchart of an additional method for use with the method shown in FIG. 6, according to an example.

FIG. 7 shows a flowchart of an example method for use with the method 500, according to an example. Block 510 involves responsive to receiving the first identifier for the first component, causing a first power switch to enable power transmission beyond the first component via the at least one power wire. The master computing device, the first controller, or another component may cause the first power switch to enable power transmission beyond the first component. In some examples, each power switch may be configured to change configuration and enable power to pass through after a predefined duration passes since the power switch initially detected power. The controller may be configured to operate the power switch based on predefined power threshold durations.

Figure 8:
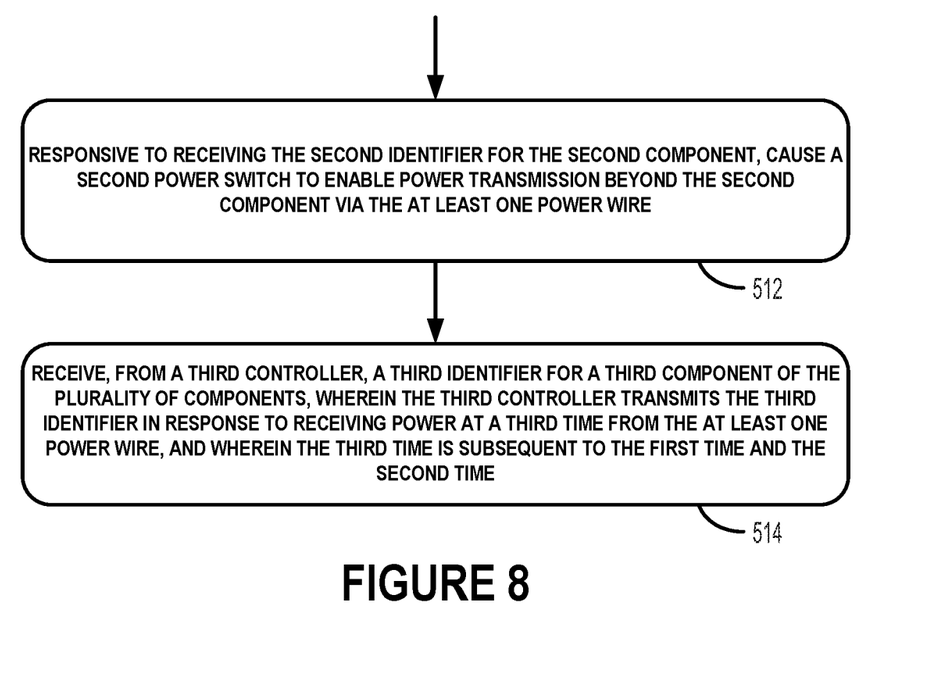
FIG. 8 shows a flowchart of yet another method for use with the method shown in FIG. 6, according to an example.

FIG. 8 shows another flowchart of an example method for use with the method 500, according to an example. Block 512 involves responsive to receiving the second identifier for the second component, causing a second power switch to enable power transmission beyond the second component via the at least one power wire. Block 514 involves receiving, from a third controller, a third identifier for a third component of the plurality of components. The third controller transmits the third identifier in response to receiving power at a third time from the at least one power wire. The third time is subsequent to the first time and the second time.

Figure 9:
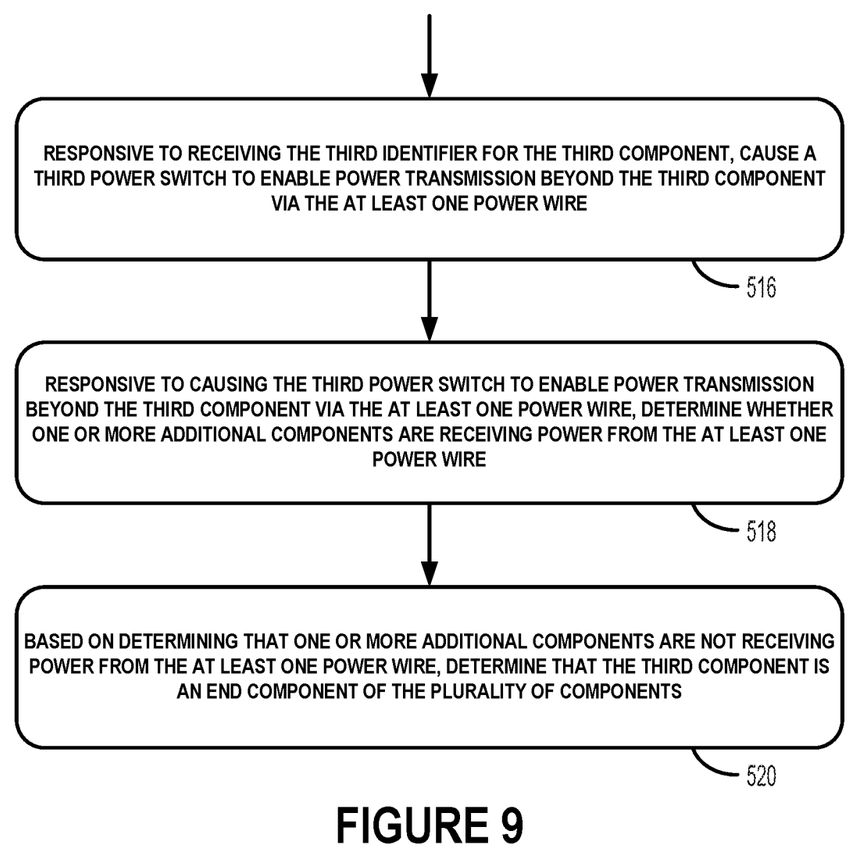
FIG. 9 shows a flowchart of a further method for use with the method shown in FIG. 6, according to an example.

FIG. 9 shows another flowchart of an example method for use with the method 500, according to an example. Block 516 involves, responsive to receiving the third identifier for the third component, causing a third power switch to enable power transmission beyond the third component via the at least one power wire.

Block 518 involves, responsive to causing the third power switch to enable power transmission beyond the third component via the at least one power wire, determining whether one or more additional components are receiving power from the at least one power wire. Block 520 involves, based on determining that one or more additional components are not receiving power from the at least one power wire, determining that the third component is an end component of the plurality of components. As such, the master computing device 110 or another computing device may determine the first location for the first component, the second location for the second component, and a third location for the third component within the aircraft in response to determining that the third component is the end component of the plurality of components.

In some examples, determining that the third component is an end component may be based on comparing a quantity of seats for the aircraft and quantity of components detected. If the comparison shows these quantities are equal, the system may determine that the third component is an end component. A computing device may also be configured to detect up to a predefined threshold number of components. This threshold may correspond on the number of seats in the aircraft. As such, the computing device may detect that a component is an end component based on the predefined threshold number of components.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for determining a location of electrical components within an aircraft comprising:
   a plurality of components installed within the aircraft, wherein the plurality of components is coupled sequentially to at least one power wire;
   a plurality of controllers, wherein each controller is configured to couple to a given component of the plurality of components;
   a master computing device for storing respective locations of the plurality of components within the aircraft, wherein the master computing device is configured to:
      receive, from a first controller, a first identifier for a first component of the plurality of components, wherein the first controller transmits the first identifier in response to receiving power at a first time from the at least one power wire;
      receive, from a second controller, a second identifier for a second component of the plurality of components, wherein the second controller transmits the second identifier in response to receiving power at a second time from the at least one power wire, and wherein the second time is subsequent to the first time;
      determine a first location for the first component and a second location for the second component within the aircraft based on an order of reception of the first identifier and the second identifier; and generate an output that specifies the first location for the first component and the second location of the second component within the aircraft.

2. The system of claim 1, wherein receiving the first identifier for the first component comprises:
receiving the first identifier for the first component from the first controller via a wired data link; and
wherein receiving the second identifier for the second component comprises:
receiving the second identifier for the second component from the second controller via the wired data link.

3. The system of claim 1, wherein receiving the first identifier for the first component comprises:
receiving the first identifier for the first component from the first controller via wireless communication; and
wherein receiving the second identifier for the second component comprises:
receiving the second identifier for the second component from the second controller via wireless communication.

4. The system of claim 1, wherein the master computing device is further configured to:
responsive to receiving the first identifier for the first component, cause a first power switch to enable power transmission via the at least one power wire beyond the first component.

5. The system of claim 4, wherein determining the first location for the first component and the second location for the second component within the aircraft based on the order of reception of the first identifier and the second identifier is further based on a predetermined seating arrangement associated with a type of aircraft that corresponds to the aircraft.

6. The system of claim 1, wherein the master computing device is further configured to:
responsive to receiving the second identifier for the second component, cause a second power switch to enable power transmission beyond the second component via the at least one power wire;
responsive to causing the second power switch to enable power transmission beyond the second component via the at least one power wire, determine whether one or more additional components are receiving power from the at least one power wire; and
based on determining that one or more additional components are not receiving power from the at least one power wire, determine that the second component is an end component of the plurality of components.

7. The system of claim 6, wherein determining the first location for the first component and the second location for the second component within the aircraft based on the order of reception of the first identifier and the second identifier comprises:
determining the first location for the first component and the second location for the second component within the aircraft in response to determining that the second component is the end component of the plurality of components.

8. The system of claim 1, wherein receiving the first identifier for the first component of the plurality of components comprises:
receiving a first media access control (MAC) address from the first controller; and
wherein receiving the second identifier for the second component of the plurality of components comprises:
receiving a second MAC address from the second controller.

9. The system of claim 1, wherein receiving the first identifier for the first component of the plurality of components comprises:
receiving a first serial number representing the first component from the first controller; and
wherein receiving the second identifier for the second component of the plurality of components comprises:
receiving a second serial number representing the second component from the second controller.

10. The system of claim 1, wherein the aircraft includes a plurality of seats arranged in a plurality of rows, wherein the first component is a first set of seat electronics for a first row of seats and the second component is a second set of seat electronics for a second row of seats.

11. The system of claim 1, wherein generating the output that specifies the first location for the first component and the second location of the second component within the aircraft comprises:
displaying a diagram of the aircraft that visually shows the first location for the first component and the second location of the second component within the aircraft.

12. The system of claim 1, wherein generating the output that specifies the first location for the first component and the second location of the second component within the aircraft comprises:
generating a signal that indicates activation of the first component in response to detecting the activation of the first component.

13. The system of claim 1, wherein the master computing device is further configured to:
initiate power transmission to the first component.

14. The system of claim 1, wherein the plurality of components is coupled sequentially to a set of power wires configured to supply three phase power to the plurality of components.

15. A method for localizing electronic components within an aircraft, the method comprising:
receiving, at a computing system and from a first controller, a first identifier for a first component of a plurality of components, wherein the plurality of components is coupled sequentially to at least one power wire within the aircraft, and wherein the first controller transmits the first identifier in response to receiving power at a first time from the at least one power wire;
receiving, at the computing system and from a second controller, a second identifier for a second component of the plurality of components, wherein the second controller transmits the second identifier in response to receiving power at a second time from the at least one power wire, and wherein the second time is subsequent to the first time;
determining, by the computing system, a first location for the first component and a second location for the second component within the aircraft based on an order of reception of the first identifier and the second identifier; and
generating an output that specifies the first location for the first component and the second location of the second component within the aircraft.

16. The method of claim 15, further comprising:
responsive to receiving the first identifier for the first component, causing a first power switch to enable power transmission beyond the first component via the at least one power wire.

17. The method of claim 16, further comprising:
responsive to receiving the second identifier for the second component, causing a second power switch to enable power transmission beyond the second component via the at least one power wire; and receiving, from a third controller, a third identifier for a third component of the plurality of components, wherein the third controller transmits the third identifier in response to receiving power at a third time from the at least one power wire, and wherein the third time is subsequent to the first time and the second time.

18. The method of claim 17, further comprising:

responsive to receiving the third identifier for the third component, causing a third power switch to enable power transmission beyond the third component via the at least one power wire;

responsive to causing the third power switch to enable power transmission beyond the third component via the at least one power wire, determining whether one or more additional components are receiving power from the at least one power wire; and based on determining that one or more additional components are not receiving power from the at least one power wire, determining that the third component is an end component of the plurality of components.

19. The method of claim 18, wherein determining the first location for the first component and the second location for the second component within the aircraft comprises:

determining the first location for the first component, the second location for the second component, and a third location for the third component within the aircraft in response to determining that the third component is the end component of the plurality of components.

20. A non-transitory computer-readable medium configured to store instructions, that when executed by one or more processors, cause a computing system to perform functions comprising:

receiving, from a first controller, a first identifier for a first component of a plurality of components, wherein the plurality of components is installed within an aircraft and coupled sequentially to at least one power wire, and wherein the first controller transmits the first identifier in response to receiving power at a first time from the at least one power wire;

receiving, from a second controller, a second identifier for a second component of the plurality of components, wherein the second controller transmits the second identifier in response to receiving power at a second time from the at least one power wire, and wherein the second time is subsequent to the first time;

determining a first location for the first component and a second location for the second component within the aircraft based on an order of reception of the first identifier and the second identifier; and generating an output that specifies the first location for the first component and the second location of the second component within the aircraft.

* * * * *